US009631585B2

(12) United States Patent
Lombardo et al.

(10) Patent No.: US 9,631,585 B2
(45) Date of Patent: Apr. 25, 2017

(54) EGHR MECHANISM DIAGNOSTICS

(71) Applicant: GM GLOBAL TECHNOLOGY OPERATIONS LLC, Detroit, MI (US)

(72) Inventors: Paul S. Lombardo, Commerce Township, MI (US); Brian L. Spohn, Holly, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 897 days.

(21) Appl. No.: 14/023,527

(22) Filed: Sep. 11, 2013

(65) Prior Publication Data

US 2015/0073680 A1 Mar. 12, 2015

(51) Int. Cl.
*G06F 11/00* (2006.01)
*F02M 26/49* (2016.01)
(Continued)

(52) U.S. Cl.
CPC ............ *F02M 26/49* (2016.02); *F02M 26/25* (2016.02); *G06F 19/00* (2013.01); *F02M 26/33* (2016.02)

(58) Field of Classification Search
CPC ........ F02M 26/49; G01K 17/10; G01K 17/08; G01K 17/06; G01K 17/12; Y02T 10/47;
(Continued)

(56) References Cited

U.S. PATENT DOCUMENTS 3,918,300 A * 11/1975 Weisstuch ............... F28F 19/00 374/170
4,300,247 A * 11/1981 Berg ........................ A47K 3/28 165/66
(Continued)

FOREIGN PATENT DOCUMENTS

CN 201003434 Y 1/2008
CN 101852134 A 10/2010
(Continued)

OTHER PUBLICATIONS

H.A. Navarro and L.C. Cabezas-Gomez; "Effectiveness—NTU Computation with a Mathematical Model for Cross-Flow Heat Exchangers"; Dec. 2007; Brazilian Journal of Chemical Engineering, vol. 24, No. 4, pp. 509-521; ISSN 0104-6632; www.abeq.org.br/bjche.*

*Primary Examiner* — Hung Q Nguyen
*Assistant Examiner* — Brian Kirby
(74) *Attorney, Agent, or Firm* — Quinn IP Law

(57) ABSTRACT

An automated method for diagnosing an EGHR having a coolant path, an exhaust path, a heat exchanger, and a valve. The coolant path passes through the heat exchanger and the valve selectively directs the exhaust path through the heat exchanger. The method includes monitoring an inlet temperature and an outlet temperature of the coolant path, determining an instantaneous coolant power from the monitored inlet temperature and outlet temperature, and integrating the instantaneous coolant power to determine a total energy recovered by the coolant path. The method monitors an instantaneous exhaust power, determines an instantaneous available EGHR power from the instantaneous exhaust power, and integrates the instantaneous available EGHR power to determine a nominal EGHR energy. A differential is calculated between the nominal EGHR energy and the total energy recovered by the coolant path. If the calculated differential is greater than an allowable tolerance, an EGHR error signal is sent.

7 Claims, 3 Drawing Sheets

(51) Int. Cl.
*G06F 19/00* (2011.01)
*F02M 26/25* (2016.01)
*F02M 26/33* (2016.01)

(58) Field of Classification Search
CPC ......... F02D 2041/0067; F02D 41/0072; F02D 41/1446; F02D 41/221; F01P 2025/52; G05B 23/02; G05B 23/0205; G06F 11/0739
USPC ......... 702/182–183; 123/568.12; 374/39–40; 165/33.1, 11.1, 292; 73/114.74
See application file for complete search history.

(56) References Cited

U.S. PATENT DOCUMENTS 4,766,553 A * 8/1988 Kaya ........................ F22B 37/56 165/11.1
5,297,047 A * 3/1994 Matsuno ............... F02D 41/221 701/107
5,353,653 A * 10/1994 Watanabe ............... F22D 1/325 165/11.1
5,368,091 A * 11/1994 Seebald ................ F28F 27/006 165/11.1
5,441,103 A * 8/1995 Rezkallah ............. F24F 12/002 165/104.29
5,638,900 A * 6/1997 Lowenstein ........ F28D 1/05358 165/153
5,732,688 A * 3/1998 Charlton ................. F02D 21/08 123/568.12
6,386,272 B1 * 5/2002 Starner .................... G01B 7/06 165/11.1
6,678,628 B2 * 1/2004 Ryan ...................... G01K 17/12 374/45
6,848,434 B2 * 2/2005 Li .......................... F02M 26/47 123/568.12
6,931,352 B2 * 8/2005 Cryer ................. B60H 1/00792 702/130
6,993,909 B2 * 2/2006 Matsunaga ......... F02D 41/0072 123/568.12
7,455,099 B2 * 11/2008 Osborn ................... F28F 19/00 165/11.1
7,571,047 B2 * 8/2009 Pfeiffer ............... G01M 15/102 123/90.15
7,657,347 B2 * 2/2010 Campbell ............. G01F 1/6965 137/340
7,726,874 B2 * 6/2010 Kirchberg ............... F28F 27/00 374/147
7,813,894 B2 * 10/2010 Prasad ................... G06Q 10/04 235/449
7,983,834 B2 * 7/2011 Blumendeller ........ F02M 26/47 123/568.12
8,028,569 B2 * 10/2011 Blumendeller ........ F02M 26/25 73/114.68
8,037,737 B2 * 10/2011 Recouvreur .......... F01N 11/002 73/114.71
8,056,544 B2 * 11/2011 Webb ..................... F02M 26/05 123/568.12
8,069,003 B2 * 11/2011 Friedrich ................ F01K 13/02 702/136
8,386,204 B2 * 2/2013 Cianflone .............. F02M 26/33 123/568.12
8,725,386 B2 * 5/2014 Khair .................. F02D 41/0065 123/568.11
2008/0216557 A1 * 9/2008 Wang .................... F02D 35/025 73/23.31
2009/0277154 A1 * 11/2009 Wood ......................... F02C 7/10 60/39.511
2010/0235141 A1 * 9/2010 Wang .................. F02D 41/1446 702/183
2010/0242489 A1 9/2010 Saha et al.
2011/0048389 A1 * 3/2011 Hsia ...................... F02D 41/005 123/568.12
2011/0155366 A1 * 6/2011 Brunn ...................... F28D 7/024 165/287
2011/0224948 A1 * 9/2011 Cianflone .............. F02M 26/33 702/183
2011/0238362 A1 * 9/2011 Kidwell ................... F24J 3/083 702/136
2012/0023954 A1 2/2012 Wichmann
2012/0023963 A1 2/2012 Wichmann et al.
2012/0312001 A1 * 12/2012 Nam ..................... F02D 41/221 60/299

FOREIGN PATENT DOCUMENTS

CN 102953818 A 3/2013
DE 19537799 A1 4/1996

* cited by examiner

EGHR MECHANISM DIAGNOSTICS

TECHNICAL FIELD

This disclosure relates to diagnostics and control of exhaust gas heat recovery (EGHR) mechanisms.

BACKGROUND

Some vehicles have exhaust gas heat recovery (EGHR) mechanisms. For example, discharge waste energy from the vehicle's exhaust may be extracted to enhance the warm-up of engine coolant. Additionally, the interior of the vehicle, liquid conditioned batteries, or thermal electric systems could also be warmed using exhaust heat energy.

SUMMARY

An automated method for diagnosing an exhaust gas heat recirculation (EGHR) mechanism is provided. The EGHR mechanism has a coolant path, an exhaust path, a heat exchanger, and a valve. The coolant path passes through the heat exchanger and the valve selectively routes, passes, or directs the exhaust path through the heat exchanger.

The automated method includes monitoring an inlet temperature of the coolant path and monitoring an outlet temperature of the coolant path. The method determines an instantaneous coolant power from the monitored inlet temperature and outlet temperature. The instantaneous coolant power is integrated to determine a total energy recovered by the coolant path.

The method also includes monitoring an instantaneous exhaust power and monitoring an instantaneous EGHR efficiency. The method determines an instantaneous available EGHR power from the instantaneous exhaust power and the instantaneous EGHR efficiency.

The method includes calculating at least one of a minimum average recovery and a maximum average recovery from the instantaneous available EGHR power and integrates the calculated minimum or maximum average recovery to determine at least one of a minimum energy tolerance and a maximum energy tolerance. The method includes comparing the total energy recovered to the minimum energy tolerance or maximum energy tolerance. If the total energy recovered is less than the determined minimum energy tolerance or if the total energy recovered is greater than the maximum energy tolerance, the method includes determining that there is an error with the EGHR mechanism and sends an EGHR error signal.

The above features and advantages, and other features and advantages, of the present invention are readily apparent from the following detailed description of some of the best modes and other embodiments for carrying out the invention, which is defined solely by the appended claims, when taken in connection with the accompanying drawings.

DETAILED DESCRIPTION

Figure 1:
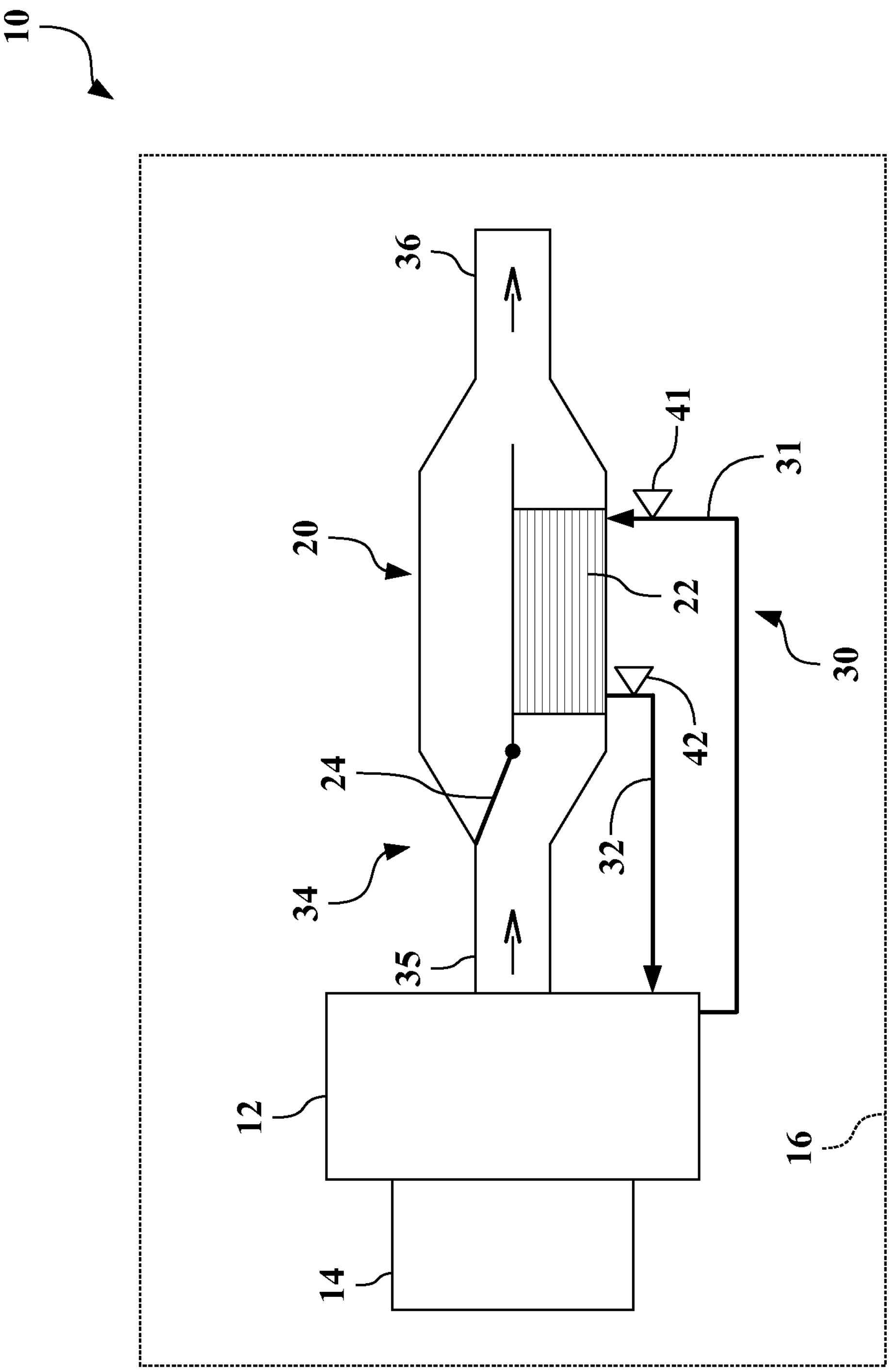
FIG. 1 is a schematic diagram of a portion of a powertrain having an exhaust gas heat recovery (EGHR) mechanism.

Referring to the drawings, like reference numbers correspond to like or similar components wherever possible throughout the several figures. There is shown in FIG. 1 a portion of a powertrain 10, which may be a conventional or hybrid powertrain. The schematic powertrain 10 shown includes an internal combustion engine 12 and an electric motor 14. The engine 12 may be spark ignition or compression ignition.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Furthermore, no features, elements, or limitations are absolutely required for operation. Any specific configurations shown in the figures are illustrative only and the specific configurations shown are not limiting of the claims or the description.

As shown in FIG. 1, a control system 16 is in communication with, and capable of operating, portions of the powertrain 10. The control system 16 is illustrated in highly schematic fashion. The control system 16 is mounted onboard the vehicle and in communication with several components of the powertrain 10. The control system 16 performs real-time, on-board detection, diagnostic, and calculation functions for the powertrain 10.

The control system 16 may include one or more components with a storage medium and a suitable amount of programmable memory, which are capable of storing and executing one or more algorithms or methods to effect control of the powertrain 10. Each component of the control system 16 may include distributed controller architecture, and may be part of an electronic control unit (ECU). Additional modules or processors may be present within the control system 16. If the powertrain 10 is a hybrid powertrain, the control system 16 may alternatively be referred to as a Hybrid Control Processor (HCP).

The control system 16 may be configured to execute an automated method for diagnosing an exhaust gas heat recovery or recirculation mechanism, or simply EGHR mechanism 20. Generally, the EGHR mechanism 20 allows the powertrain 10 to selectively capture thermal energy being expelled from the engine 12 as a result of combustion.

The EGHR mechanism 20 includes a heat exchanger 22 and a valve 24. A coolant path 30, which includes a coolant inlet 31 and a coolant outlet 32, passes through the heat exchanger 22. The coolant path 30 also passes or flows through the engine 12, and may pass through other components, such as a transmission (not shown) or heater core (not shown).

In the highly schematic diagram shown, coolant fluid within the coolant path 30 flows substantially-constantly through the heat exchanger 22. However, some systems may include a bypass channel or a variable pump to selectively prevent coolant from flowing through the heat exchanger 22.

An exhaust path 34, having an exhaust inlet 35 and an exhaust outlet 36, also passes through the EGHR mechanism 20. However, depending on operating conditions of the powertrain 10, the valve 24 selectively directs flow of the exhaust path 34 through the heat exchanger 22. The exhaust path 34 carries exhaust gases from the engine 12 to, ultimately, be expelled from the vehicle. The exhaust gases have varying levels of thermal energy (heat), some of which may be captured by the heat exchanger 22 of the EGHR mechanism 20 and redirected via the coolant path 30 to the engine 12 or other components.

The valve 24 is selectively movable or adjustable between at least two positions: a recovery mode and a bypass mode. The recovery mode is schematically illustrated in FIG. 1 and is configured to direct the flow of exhaust gases through the exhaust path 34 through the heat exchanger 22. In recovery mode the coolant path 30 and the exhaust path 34 are in direct heat-transfer communication through the heat exchanger 22. Generally, when the valve 24 and the EGHR mechanism 20 are in recovery mode, the exhaust path 34 will transfer thermal energy to the coolant path 30 and will warm the coolant therein.

When the valve 24 and the EGHR mechanism 20 are in bypass mode, the exhaust path 34 does not pass through the heat exchanger 22. Although the coolant path 30 and the exhaust path 34 are not in direct heat-transfer communication through the heat exchanger 22, some thermal energy may be transferred from the exhaust path 34 to the coolant path 30. This energy transfer may be referred to as parasitic heat and may be the result of the close proximity, even when in the bypass mode, of the coolant path 30 to the exhaust path 34.

The valve 24 may be any suitable mechanism capable of switching the EGHR mechanism 20 between the recovery mode and the bypass mode. Note that the valve 24 may also be capable of directing only a portion of the exhaust path 34 through the heat exchanger 22, which may be referred to as partial-recovery mode. The valve 24 may be, for example and without limitation: a wax motor or an electromechanical switch.

Wax motors may be actuated by temperature of the coolant within the coolant path 30, such that the wax motor closes the heat exchanger 22 from the exhaust path 34 as the coolant warms. An electromechanical switch may respond to a signal from the control system 16 to place the valve 24 into either the bypass or recovery mode. Note that regardless of the mechanism used, the valve 24 may default to either the bypass mode or the recovery mode, depending upon system design.

A first sensor 41 is disposed within or adjacent to the coolant inlet 31, such that the first sensor 41 determines the temperature of the coolant entering the EGHR mechanism 20 and the heat exchanger 22. Similarly, a second sensor 42 is disposed within or adjacent to the coolant outlet 32, such that the second sensor 42 determines the temperature of the coolant leaving the EGHR mechanism 20 and the heat exchanger 22.

The first sensor 41 measures an inlet temperature, $T_i$, of the coolant and the second sensor measures an outlet temperature, $T_o$, of the coolant. The control system 16 reads the first temperature and the second temperature or receives the reading from other components, such as intermediate signal processors.

Figure 2:
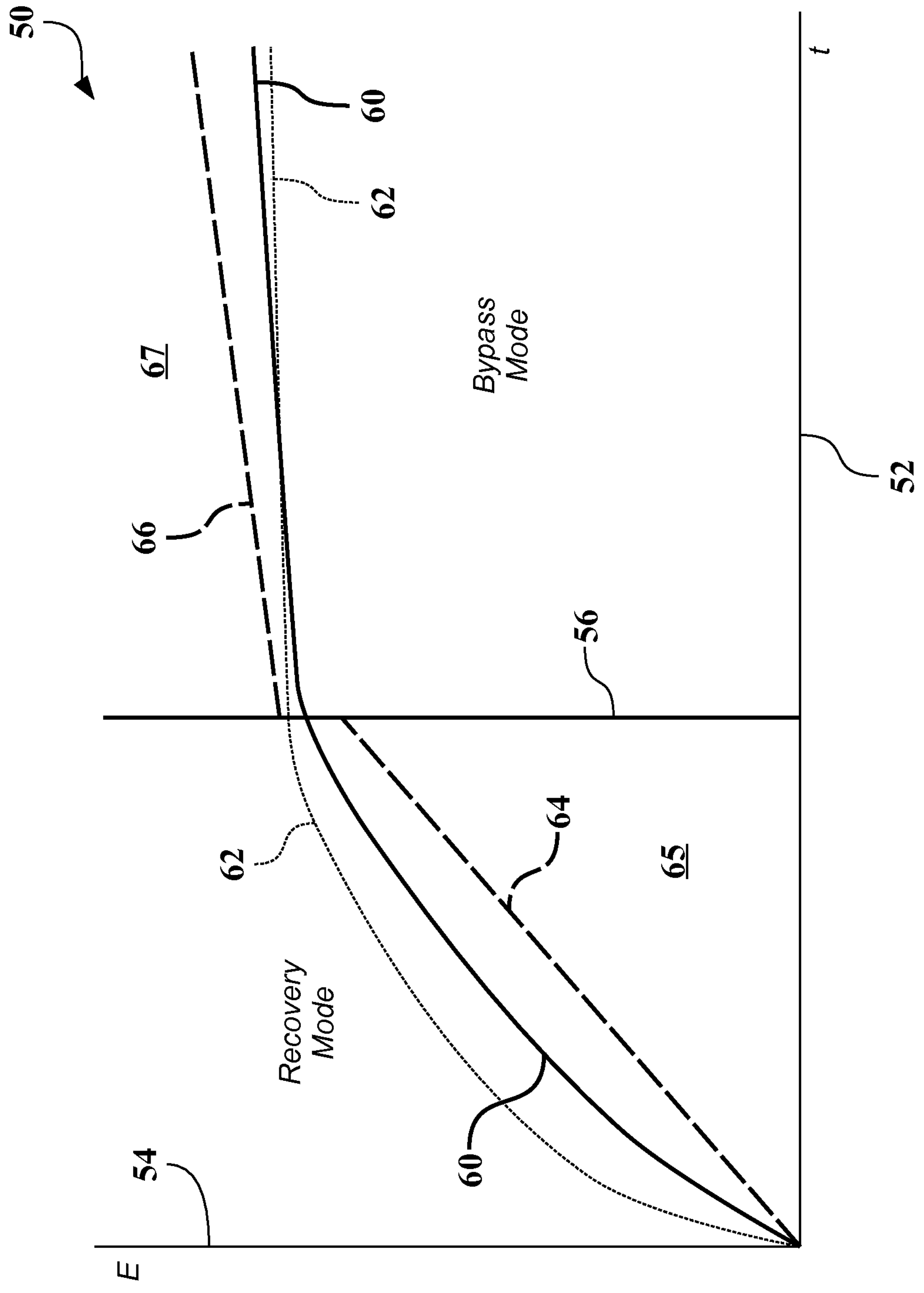
FIG. 2 is a schematic chart illustrating energy capture by the EGHR mechanism.

Referring now to FIG. 2, and with continued reference to FIG. 1, there is shown a chart 50, which illustrates energy capture by the EGHR mechanism 20 in both the recovery mode and the bypass mode. The chart 50 includes an axis 52, which represents time, and an axis 54, which represents thermal energy recovered by the EGHR mechanism 20 to coolant within the coolant path 30.

A mode-switch line 56 illustrates the approximate time at which the valve 24 switches from recovery mode to bypass mode. A first time period, to the left of the mode-switch line 56, is representative of the EGHR mechanism 20 being in heat recover mode.

The first time period may occur just after startup of the engine 20, such that it may be beneficial to capture thermal energy traveling through the exhaust path 34 and use that energy to warm the engine 20 or other components. During the first time period, the EGHR mechanism 20 should, ideally, capture as much of the thermal energy available in the exhaust path 34. The second time period may occur after the engine 20—and possibly also the heater core—is warm and no longer in need of recovered thermal energy.

Note that the mode-switch line 56 is representative of a desired change in the position of the valve 24. In some instances, even though the control system 16 determines that the valve 24 should switch positions, the valve 24 may be stuck or there may be a problem with actuation of the valve 24.

An actual coolant energy line 60 represents the total energy recovered by the EGHR mechanism 20 to the coolant path 30. The total energy recovered is an accumulation of the instantaneous power captured by the coolant path 30, as measured by the first sensor 41 and the second sensor 42. The instantaneous coolant power may be determined by the first equation from mass flow of coolant, specific heat of the coolant, and temperature change.

$$\dot{Q}_c=\dot{m}_c\cdot c_p(T_o-T_i) \quad (1)$$

The mass flow of the coolant in the coolant path 30 may be measured, such as by a flow meter, or may be estimated from operating conditions of other components. For example the speed of the engine 12 and the speed or power of pumps circulating the coolant may be used to estimate the mass flow. The specific heat may be estimated based upon the type of coolant and the ratio of coolant to water in the coolant path 30.

The instantaneous coolant power may then be integrated to determine the total energy recovered, as shown in the second equation.

$$Q_c=\int\dot{Q}_c dt \quad (2)$$

A nominal energy line 62 represents the total energy available to be recovered by the EGHR mechanism 20 into the coolant path 30. The nominal energy line 62 is based upon the thermal power of the exhaust gases exiting the engine 12.

When the EGHR mechanism 20 is operating at or near its optimal, the nominal energy line 62 and the actual coolant energy line 60 overlap. However, significant movements away from the nominal EGHR energy suggest that the EGHR mechanism 20 is not working properly, either because the EGHR mechanism 20 is recovering too little or too much of the available exhaust power. Possible causes of the fault may include, without limitation: a malfunctioning valve 24; a blockage in the coolant path 30 or the heat exchanger 22; a leak or failure in the exhaust path 34; or other causes.

When there is a fault occurring with the EGHR mechanism 20, regardless of the cause, the control system 16 sends or displays an error signal. For example, the control system 16 may display an error light or indicator light—such as a dashboard display icon—to alert the vehicle operator to the fault and may store an error code if the indicator light is not specific to the EGHR mechanism 20, such as a check engine light. Alternatively, the control system 16 may utilize a communications network to alert a remote maintenance monitoring system, such as a phone, an email address, or a subscription-based centralized monitor.

To assess whether the actual coolant energy line 60 is too far from the nominal energy line 62, the control system 16 may compare the difference between the actual coolant energy line 60 and the nominal energy line 62 to an allowable tolerance or variance. The allowable tolerance represents the amount by which the actual total energy recovered by the coolant path 30 may vary from the nominal EGHR energy. The allowance tolerance may be a fixed value or may vary based upon operating conditions.

Alternatively, as shown in the chart 50, the control system 16 may compare the actual coolant energy line 60 to a minimum tolerance line 64, below which is a fault zone 65, or to a maximum tolerance line 66, above which is a fault zone 67. When the actual coolant energy line 60 falls below the minimum tolerance line 64 or moves above the maximum tolerance line 66, the control system 16 may signal a fault in the EGHR mechanism 20.

Whether the control system 16 uses differentials—such as the allowable tolerance—or compares the actual coolant energy line 60 to the minimum tolerance line 64 and the maximum tolerance line 66, those comparison tolerances may be calculated as either fixed values or percentages of the nominal energy line 62. Alternatively, the minimum tolerance line 64 or the maximum tolerance line 66 may be curves based upon integrating the instantaneous exhaust thermal power available to the EGHR mechanism 20 and the efficiency of the EGHR mechanism 20.

In the illustrative example shown in the chart 50, the engine 12 is outputting substantially constant thermal energy. The minimum tolerance line 64 is calculated based upon the EGHR mechanism 20 recovering approximately fifty-five percent of the available thermal power from the exhaust path 34 to the coolant path 30 while the valve 24 is in the recovery mode, which is shown to the left of the mode-switch line 56.

Similarly, when the valve 24 is in the bypass mode, which is shown to the right of the mode-switch line 56, the maximum tolerance line 66 is calculated based upon the EGHR mechanism 20 recovering approximately nine percent of the available thermal power from the exhaust path 34 to the coolant path 30.

Note that when the exhaust path 34 is not carrying substantially constant thermal energy, the curves will vary more than in the chart 50 and there may be additional mode-switch lines 56. However, the energy-capture rates used to establish the allowable tolerance may be the same.

The nominal energy line 62 is representative of the best performance that can be expected from the EGHR mechanism 20. The nominal energy line 62 may also account for the efficiency of the EGHR mechanism 20 transferring that thermal power to the coolant path 30, which is shown in the third equation. Note that the ideal efficiency may vary based upon operating conditions of the engine 12.

$$Q_{nom}=\int f(\dot{m}_{ex},T_{ex})\cdot \mathrm{Eff}_{ideal}\cdot dt=\int \dot{Q}_{ex}\cdot \mathrm{Eff}_{ideal}\cdot dt \quad (3)$$

The exhaust temperature may be estimated based upon operating conditions of the engine 12 and any after-treatment systems. The mass flow of exhaust path 34 is based upon fuel and air entering the engine 12, and may incorporate transport delays. If calculated, the specific heat of the exhaust is a function of the temperature of the exhaust. The allowable power flow is based upon minimum or maximum efficiency terms, as shown in the fourth equation.

$$\dot{Q}_{allow}=\dot{Q}_{ex}\cdot \mathrm{Eff}_{mix/max} \quad (4)$$

When the valve 24 is in the recovery mode, the control system 16 uses the recovery or minimum efficiency term, which may be approximately fifty-five percent; and when the valve 24 is in the bypass mode, the control system 16 uses the bypass or maximum efficiency term, which may be approximately nine percent. The allowable power flow may be integrated to establish the minimum tolerance line 64 and the maximum tolerance line 66.

Figure 3:
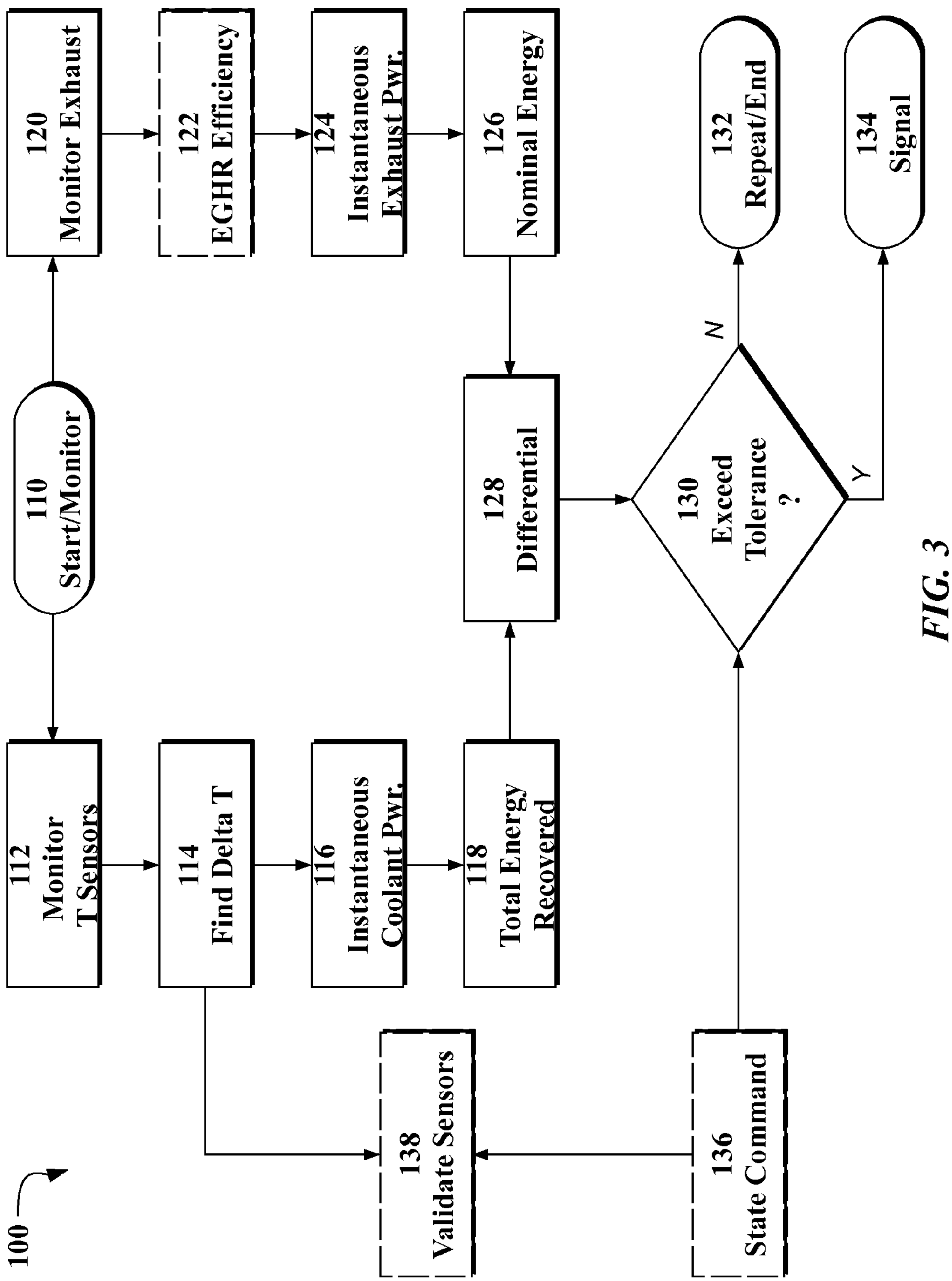
FIG. 3 is a schematic flow chart illustrating an algorithm or method for controlling and diagnosing an EGHR mechanism, such as that shown in FIG. 1.

Referring now to FIG. 3, and with continued reference to FIGS. 1-2, there is shown a method 100 for controlling and diagnosing a powertrain with an EGHR mechanism, such as the powertrain 10 shown in FIG. 1. The method 100 may be executed completely or partially within the control system 16.

FIG. 3 shows only a high-level diagram of the method 100. The exact order of the steps of the algorithm or method 100 shown may not be required. Steps may be reordered, steps may be omitted, and additional steps may be included. Steps shown in dashed or phantom lines may be optional. However, depending upon the specific configuration, any steps may be considered optional or may be implemented only selectively. Furthermore, the method 100 may be a portion or sub-routine of another algorithm or method.

For illustrative purposes, the method 100 is described with reference to elements and components shown and described in relation to FIG. 1 and may be executed by the powertrain 10 itself or by the control system 16. However, other components may be used to practice the method 100 or the invention defined in the appended claims. Any of the steps may be executed by multiple controls or components of the control system 16.

Step 110: Start/Begin Monitoring.

The method 100 may begin at a start or initialization step, during which time the method 100 is made active and is monitoring operating conditions of the vehicle, the powertrain 10 and, particularly, the engine 12 and the EGHR mechanism 20. Initiation may occur, for example, in response to the vehicle operator inserting the ignition key or the vehicle being placed into a mode in which the propulsion systems are active (i.e., the vehicle is ready to drive). The method 100 may be running constantly or looping constantly whenever the propulsion systems—including, at least, the engine 12 or the electric motor 14—are in use.

Step 112: Monitor Coolant Inlet and Outlet.

The method 100 includes monitoring an inlet temperature, $T_i$, of the coolant path 30 at the coolant inlet 31, such as with the first sensor 41. The method 100 also includes monitoring an outlet temperature, $T_o$, of the coolant path 30 at the coolant outlet 32; such as with the second sensor 42.

Any and all data output by the sensors shown and other sensors may be monitored by the method 100. Furthermore, simple calculations within control system 16 or data provided by other modules or controllers are not described in detail and may be considered as monitored by the method 100.

Step 114: Determine Temperature Change.

The method 100 finds the temperature difference between the coolant inlet 31 and the coolant outlet 32. If the temperature changes, thermal power has been transferred to the coolant path 30.

Step 116: Calculate Instantaneous Coolant Power.

The 100 includes determining an instantaneous coolant power from the monitored inlet temperature and outlet temperature. The instantaneous coolant power may be determined from the equation above or a similar formula.

Step 118: Calculate Total Energy Recovered.

The method 100 integrates the instantaneous coolant power to determine a total energy recovered by the coolant path 30. Depending upon the operating mode, the control system 16 may be trying to recover high amounts of energy from the exhaust path 34 to the coolant path 30.

Step 120: Monitor Engine Conditions.

The method 100 also monitors an instantaneous exhaust power. The instantaneous exhaust power may be determined as a function of the exhaust mass flow and the exhaust temperature. Alternatively, the instantaneous exhaust power may be determined from the amount of fuel combusted in the engine 12 or the torque produced by the engine 12.

Step 122: Determine EGHR Efficiency.

The method 100 includes monitoring an instantaneous EGHR efficiency of the EGHR mechanism 20. The efficiency is the actual, and possibly ideal, ability of the EGHR mechanism 20 to transfer heat power of the exhaust path 34 to the coolant path 30. The instantaneous EGHR efficiency varies with the temperature and flow conditions of the exhaust path 34. Note that the method 100 may also use fixed values for the efficiency.

The maximum instantaneous EGHR efficiency may be around seventy percent. However, under many operating conditions, the efficiency will be in the sixty percent range, or less. The method 100 may also use the ideal efficiency to determine the allowable tolerance against which the total energy recovered by the coolant path 30 is compared.

Step 124: Calculate Instantaneous Exhaust Power.

The method 100 includes determining an instantaneous available EGHR power from the instantaneous exhaust power. The instantaneous available EGHR power may be determined by the instantaneous exhaust power multiplied by an assumed flat rate efficiency value. However, the instantaneous available EGHR power may also be determined from both the instantaneous exhaust power and the instantaneous EGHR efficiency. When variable efficiency is used, the method 100 may be more precise over a larger range of operating conditions of the engine 12 and the EGHR mechanism 20.

Step 126: Calculate Nominal Energy Available.

The method 100 integrates the instantaneous available EGHR power to determine a nominal EGHR energy.

Step 128: Calculate Energy Differential.

To determine whether a fault exists in the EGHR mechanism 20, the method 100 includes calculating a differential between the nominal EGHR energy and the total energy recovered by the coolant path 30. Alternatively, the method 100 may skip calculation of the energy differential, and directly compare the total energy recovered to minimum and maximum allowable tolerance levels.

Step 130: Compare Energy Differential to Allowable Tolerance.

The method 100 includes comparing the differential to an allowable tolerance. Thermal power spikes or fluctuations, particularly during transient operating conditions of the engine 12, are not representative of problems with the EGHR mechanism 20. Therefore, the control system 16 and the method 100 account for transient conditions without improperly diagnosing an error in the EGHR mechanism 20. By integrating the instantaneous coolant power to determine the total energy recovered, thermal power fluctuations do not drastically alter the total energy values. For example, even if the instantaneous power unexpectedly doubles for two seconds, the relative change in the total energy recovered will not trigger the method 100 to signal an error.

Whether comparing a differential to an allowable tolerance or directly comparing the total energy recovered to minimum and maximum values, the method may use average capture rates as comparisons. For example, the method 100 may use a minimum average recovery of fifty-five percent of the instantaneous exhaust power when the EGHR mechanism 20 is in the recovery mode, and may use a maximum average recovery of nine percent of the instantaneous exhaust power when the EGHR mechanism 20 is in the bypass mode.

Step 132: Repeat/End.

If there is no fault with the EGHR mechanism 20, such that there is no need to signal a fault or error code, the method 100 may end or repeat. The method 100 may continually loop or iterate.

Step 134: Signal Error.

If the calculated differential is greater than an allowable tolerance, the method 100 sends an EGHR error signal because there may be a fault with the EGHR mechanism 20. The method 100 may signal the fault to an indicator light to alert the operator of the vehicle or may signal to a communications network.

The EGHR error signal indicates that there is a fault with the EGHR mechanism, but may not indicate the source or cause of the fault, which may be due to a malfunctioning valve 24, faulty heat exchanger 22, or other causes. Alternatively, the control system 16 may directly compare the total energy recovered by the coolant path 30 to minimum values, maximum values, or both. For example, the allowable tolerance may be calculated by comparing the nominal EGHR energy to one of the minimum tolerance line 64 and the maximum tolerance line 66.

Regardless of the reasons for the error, the EGHR mechanism 20 needs to be inspected to determine where the fault exists, so the control system 16 sends a notification of the error. After signaling the fault, the method 100 may return to looping or iterating.

Step 136: Determine State Command.

The method 100 may also incorporate the state command for the valve 24 and determine whether the EGHR mechanism 20 is in recovery mode or bypass mode. Determining the state command may assist the method 100 in determining the allowable tolerance for the total energy recovered by the coolant path 30.

However, in some configurations, the method 100 may determine the state based upon the average of the instantaneous coolant power. For example, when the EGHR mechanism 20 is recovering less than twenty-five percent of the available exhaust energy, the method 100 may assume that the EGHR mechanism is in the bypass mode.

When the method 100 is determining the state command, the control system 16 may command the valve 24 into a recovery mode, in which both the coolant path 30 and the exhaust path 34 pass through the heat exchanger 22, for a first time period. Then, the method 100 may calculate the allowable tolerance from the minimum line during the first time period.

The first time period is illustrated in the chart 50 as the area to the left of the mode-switch line 56. During the first time period, if the total energy recovered falls into the fault zone 65, then the control system 16 signals an error or fault with the EGHR mechanism 20.

The control system 16 may also command the valve 24 into the bypass mode, in which only the coolant path 30 passes through the heat exchanger 22, for a second time period. Then, the method 100 may calculate the allowable tolerance from the maximum line 64 during the second time period. The second time period is different from the first time period and is illustrated in the chart 50 as the area to the right of the mode-switch line 56.

Step 138: Validate Temperature Sensors.

The method 100 may include validating the temperature sensors from the state and temperature information. The control system 16 may prevent flow through the exhaust path 34 during a third time period. For example, the control system 16 may shut down the engine 12, such that no exhaust gases are being produced, during periods in which the powertrain 10 is propelled by the electric motor 14 or other hybrid propulsion systems. Furthermore, extended deceleration fuel cut-off (DFCO) periods may reduce thermal energy passing through the exhaust path 34.

Following lapse of the third time period, the control system 16 compares the monitored inlet temperature to the monitored outlet temperature. The third time period is configured to be sufficient length that any remaining thermal energy in the exhaust path 34 or the heat exchanger 22 has dissipated or transferred to the coolant path 30. Therefore, monitored inlet temperature and the monitored outlet temperature should come together and become substantially equal.

However, if the monitored outlet temperature is not substantially equal to the monitored inlet temperature, there may be an error with either the first sensor 41 or the second sensor 42. Therefore, the control system 16 may send a sensor error signal.

Additionally, the method 100 may validate temperature sensors by monitoring temperature behavior after start-up of the engine 12 following long vehicle-off periods. For example, if the vehicle has been sitting in eighty-degree ambient weather for six hours, the inlet and outlet temperatures should begin at around eighty degrees. However, the temperatures of the coolant in the coolant path 30 should increase as a result of thermal heat extracted from the EGHR heat exchanger 22 and also thermal energy generated within the engine 12.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. An automated method for diagnosing an exhaust gas heat recirculation (EGHR) mechanism having a coolant path, an exhaust path, a heat exchanger, and a valve, wherein the coolant path passes through the heat exchanger and the valve selectively directs the exhaust path through the heat exchanger, the automated method comprising:

monitoring an inlet temperature of the coolant path;

monitoring an outlet temperature of the coolant path;

determining an instantaneous coolant power from the monitored inlet temperature and outlet temperature;

integrating the instantaneous coolant power to determine a total energy recovered by the coolant path;

monitoring an instantaneous exhaust power;

monitoring an instantaneous EGHR efficiency;

determining an instantaneous available EGHR power from both the instantaneous exhaust power and the instantaneous EGHR efficiency;

integrating the instantaneous available EGHR power to determine a nominal EGHR energy;

calculating a differential between the nominal EGHR energy and the total energy recovered by the coolant path;

if the calculated differential is greater than an allowable tolerance, sending an EGHR error signal;

commanding the valve into a recovery mode, in which both the coolant path and the exhaust path pass through the heat exchanger, for a first time period;

calculating the allowable tolerance from a minimum average recovery during the first time period;

commanding the valve into a bypass mode, in which only the coolant path passes through the heat exchanger, for a second time period different from the first time period; and calculating the allowable tolerance from a maximum average recovery during the second time period.

2. The automated method of claim 1, further comprising:

displaying an indicator light in response to said error signal.

3. The automated method of claim 2, further comprising:

preventing flow through the exhaust path during a third time period;

following lapse of the third time period, comparing the monitored inlet temperature to the monitored outlet temperature; and if the monitored outlet temperature is not substantially equal to the monitored inlet temperature, sending a sensor error signal.

4. The automated method of claim 3, wherein the minimum average recovery is fifty-five percent of the instantaneous exhaust power, and the maximum average recovery is nine percent of the instantaneous exhaust power.

5. An automated method for diagnosing an exhaust gas heat recirculation (EGHR) mechanism having a coolant path, an exhaust path, a heat exchanger, and a valve, wherein the coolant path passes through the heat exchanger and the valve selectively routes the exhaust path through the heat exchanger, the automated method comprising:

monitoring an inlet temperature of the coolant path with a first temperature sensor disposed at an inlet of the coolant path to the heat exchanger;

monitoring an outlet temperature of the coolant path with a second temperature sensor disposed at an outlet of the coolant path from the heat exchanger;

determining an instantaneous coolant power from the monitored inlet temperature and outlet temperature;

integrating the instantaneous coolant power to determine a total energy recovered by the coolant path;

monitoring an instantaneous exhaust power;

monitoring an instantaneous EGHR efficiency;

determining an instantaneous available EGHR power from the instantaneous exhaust power and the instantaneous EGHR efficiency;

calculating one of a minimum average recovery and a maximum average recovery from the instantaneous available EGHR power;

integrating the calculated one of the minimum average recovery and the maximum average recovery to determine one of a minimum energy tolerance and a maximum energy tolerance; and if the total energy recovered is less than the minimum energy tolerance or if the total energy recovered is greater than the maximum energy tolerance, sending an EGHR error signal, and displaying the error signal with an indicator light.

6. The automated method of claim 5, further comprising:

commanding the valve into a recovery mode, in which both the coolant path and the exhaust path pass through the heat exchanger, for a first time period;

calculating the allowable tolerance from the minimum average recovery during the first time period;

commanding the valve into a bypass mode, in which only the coolant path passes through the heat exchanger, for a second time period different from the first time period; and calculating the allowable tolerance from the maximum average recovery during the second time period.

7. The automated method of claim 6, further comprising:

preventing flow through the exhaust path during a third time period;

following lapse of the third time period, comparing the monitored inlet temperature to the monitored outlet temperature; and if the monitored outlet temperature is not substantially equal to the monitored inlet temperature, sending a sensor error signal.

* * * * *